United States Patent
Alsewailem

(10) Patent No.: US 9,079,334 B2
(45) Date of Patent: Jul. 14, 2015

(54) INTEGRATED SINGLE AND TWIN SCREW EXTRUDER

(75) Inventor: Fares D. Alsewailem, Riyadh (SA)

(73) Assignee: KING ABDULAZIZ CITY FOR SCIENCE AND TECHNOLOGY, Riyadh (SA)

(*) Notice: Subject to any disclaimer, the term of this patent is extended or adjusted under 35 U.S.C. 154(b) by 652 days.

(21) Appl. No.: 13/458,001

(22) Filed: Apr. 27, 2012

(65) Prior Publication Data

US 2013/0285279 A1 Oct. 31, 2013

(51) Int. Cl.

| | |
|---|---|
| B29B 7/34 | (2006.01) |
| B29C 47/60 | (2006.01) |
| B29B 7/42 | (2006.01) |
| B29C 47/50 | (2006.01) |
| B29C 47/66 | (2006.01) |
| B29C 47/08 | (2006.01) |
| B29B 7/46 | (2006.01) |
| B29B 7/48 | (2006.01) |
| B29C 47/36 | (2006.01) |
| B29C 47/40 | (2006.01) |
| B01F 15/06 | (2006.01) |
| B29C 47/64 | (2006.01) |

(52) U.S. Cl.
CPC . B29B 7/428 (2013.01); B29B 7/46 (2013.01); B29B 7/484 (2013.01); B29B 7/488 (2013.01); B29C 47/0827 (2013.01); B29C 47/366 (2013.01); B29C 47/402 (2013.01); B29C 47/406 (2013.01); B29C 47/50 (2013.01); B29C 47/60 (2013.01); B29C 47/6006 (2013.01); B29C 47/6093 (2013.01); B29C 47/661 (2013.01); B29C 47/662 (2013.01); B29C 47/64 (2013.01)

(58) Field of Classification Search
USPC .......... 425/200, 204, 205, 378.1; 366/83, 91, 366/291
See application file for complete search history.

(56) References Cited

U.S. PATENT DOCUMENTS

| | | | | |
|---|---|---|---|---|
| 2,441,222 | A | * | 5/1948 | Fuller .............................. 366/84 |
| 3,138,825 | A | * | 6/1964 | Colombo ...................... 425/204 |
| 3,305,893 | A |   | 2/1967 | Machen |

(Continued)

FOREIGN PATENT DOCUMENTS

| | | |
|---|---|---|
| GB | 950149 | 2/1964 |
| JP | 2202425 A | 8/1990 |
| JP | 2010184372 A | 8/2010 |

*Primary Examiner* — Atul P. Khare
(74) *Attorney, Agent, or Firm* — Andrew M. Calderon; Roberts Mlotkowski Safran & Cole, P.C.

(57) ABSTRACT

An extruder is disclosed, and more particularly, to an integrated single screw extruder and a twin screw extruder for mixing, compounding, kneading and/or extruding of materials. The integrated extruder includes a first barrel assembly and a second barrel assembly. The integrated extruder further includes a first screw having a first threaded portion and a second threaded portion. The first threaded portion is housed within the first barrel assembly and is configured to provide upstream material processing. The second threaded portion is housed within the second barrel assembly and is configured to provide downstream material processing. The integrated extruder further includes a second screw having a non-threaded shaft portion and a threaded portion. The threaded portion of the second screw is housed within the second barrel assembly and is configured to provide the downstream material processing with the second threaded portion of the first screw.

11 Claims, 3 Drawing Sheets

(56) References Cited

U.S. PATENT DOCUMENTS

| | | | |
|---|---|---|---|
| 3,305,894 A * | 2/1967 | Boden et al. | 366/85 |
| 3,744,770 A | 7/1973 | Ocker et al. | |
| 3,829,067 A * | 8/1974 | Matsuoka | 366/81 |
| 4,423,960 A * | 1/1984 | Anders | 366/75 |
| 6,068,466 A | 5/2000 | Morita | |
| 6,299,340 B1 * | 10/2001 | Lu et al. | 366/76.3 |
| 6,652,254 B2 * | 11/2003 | Shimura et al. | 425/4 R |
| 8,066,423 B2 | 11/2011 | Neubauer | |
| 8,079,747 B2 * | 12/2011 | Ek et al. | 366/80 |
| 2003/0214067 A1 | 11/2003 | Murdock et al. | |
| 2010/0238759 A1 * | 9/2010 | Pohl | 366/81 |
| 2013/0242689 A1 * | 9/2013 | Alsewailem | 366/144 |

* cited by examiner

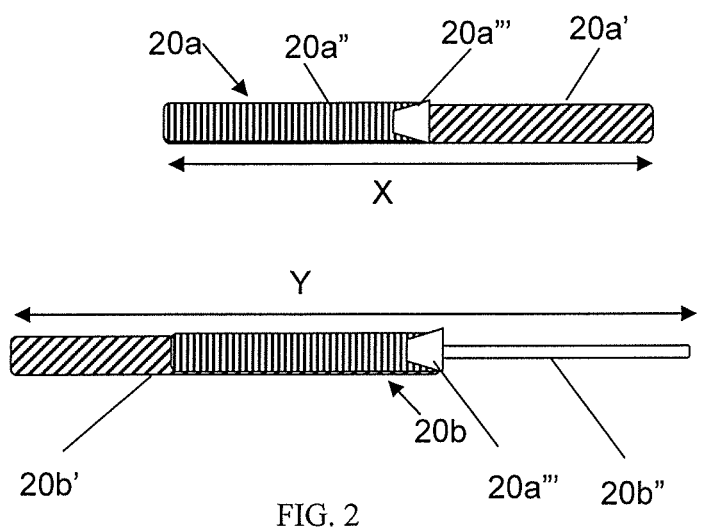
FIG. 2
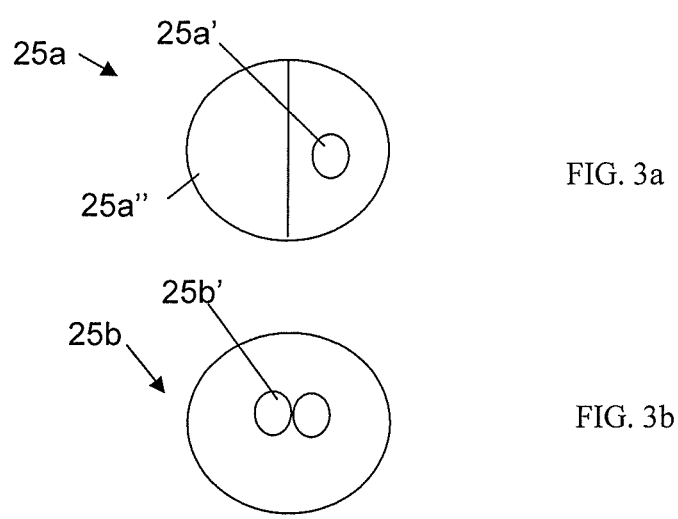
FIG. 3a
FIG. 3b

INTEGRATED SINGLE AND TWIN SCREW EXTRUDER

FIELD OF THE INVENTION

The invention relates to an extruder and, more particularly, to an integrated single screw extruder and a twin screw extruder for mixing, compounding, kneading and/or extruding of materials.

BACKGROUND OF THE INVENTION

Several techniques are available to process materials, including single screw extruders, twin screw extruders and batch mixers. Single screw extrusion is typically used for core operations in polymer processing. A goal of a single screw extrusion process is to build pressure in a polymer melt so that it can be extruded through a die or injected into a mold. Twin screw extrusion, on the other hand, is used extensively for mixing, compounding, reacting and extruding materials. For example, twin screw extruders can be used for processing many types of polymeric materials; although other materials can also be processed with twin screw extruders such as raw materials for food processing.

In operation, twin screw extruders have a profile for extrusion of thermally sensitive materials (e.g., PVC) and specialty polymer processing operations, such as compounding, devolatilization, chemical reactions, etc. Also, twin screw extruders exhibit improved processing capabilities. For example, twin screw extruders can have intermeshing or non-intermeshing screws along each of their entire length and throughout the housing, and can be designed as co-rotating or counter-rotating to achieve particular mixing characteristics. In this way, using intermeshing screws, the twin screw extruders can offer improved feeding and more positive conveying characteristics, which allow the machine to process hard-to-feed materials (e.g., powders, slippery materials, etc.). The twin screw extruders also yield short residence times and a narrow residence time distribution (RTD). Also, the twin screw extruders exhibit improved mixing, with larger heat transfer areas to allow improved control of stock temperatures.

SUMMARY OF THE INVENTION

In a first aspect of the invention, an integrated extruder comprises a first barrel assembly and a second barrel assembly. The integrated extruder further comprises a first screw having a first threaded portion and a second threaded portion. The first threaded portion is housed within the first barrel assembly and is configured to provide upstream material processing. The second threaded portion is housed within the second barrel assembly and is configured to provide downstream material processing. The integrated extruder further comprises a second screw having a non-threaded shaft portion and a threaded portion. The threaded portion of the second screw is housed within the second barrel assembly and is configured to provide the downstream material processing with the second threaded portion of the first screw.

In another aspect of the invention, an integrated extruder comprises a single screw barrel assembly and a twin screw barrel assembly detachably affixed to the single screw barrel assembly. The integrated extruder further comprises a first screw having a first threaded portion housed within the single screw barrel assembly and a second threaded portion housed within the twin screw barrel assembly. The integrated extruder further comprises a second screw having a shaft portion and a threaded portion. The threaded portion of the second screw is housed within the twin screw barrel assembly.

In yet another aspect of the invention, a method of processing material comprises: placing material within a hopper assembly for feeding into a first housing having a single threaded portion of a screw; processing the material within the first housing with the single threaded portion; transporting the processed material from the first housing to a second housing using the single threaded portion of the screw; further processing the processed material with a twin screw configuration comprising a second threaded portion of the screw and a threaded portion of a second screw; and metering the material to a die with the twin screw configuration.

BRIEF DESCRIPTION OF THE DRAWINGS

The present invention is described in the detailed description which follows, in reference to the noted plurality of drawings by way of non-limiting examples of exemplary embodiments of the present invention.

FIG. 2 shows an exploded view of the screws in accordance with aspects of the present invention;

FIGS. 3a and 3b show the respective compartments (e.g., barrel assemblies) of the twin screw extruder in accordance with aspects of the present invention.

DETAILED DESCRIPTION OF THE INVENTION

The invention relates to an extruder and, more particularly, to an integrated single screw extruder and twin screw extruder for mixing, compounding, kneading and/or extruding of materials. In embodiments, the present invention can be operated as a single screw extruder or a twin screw extruder, without the need to have two separate extruders. As should be understood by those of skill in the art, the configuration of the present invention is very economical due to capital cost reduction.

In embodiments, the present invention combines a single screw configuration and twin screw configuration into a single extruder machine. For example, in embodiments, a first barrel assembly is used to house a single screw configuration and a second barrel assembly is used to house a twin screw configuration. Advantageously, the barrel assemblies are configured to separate from one another, so that the single screw configuration can be used alone. Also, as it should be understood by those of ordinary skill in the art, in conventional extruders, there are several extruding zones: solid conveying, transition, melting and kneading, and metering; however, in the extruder of the present invention, there is no need to provide two screws to convey and transit molten polymers to the kneading section. Instead, in the extruder of the present invention, a single screw can be used to convey and transit molten polymers (or other materials) to the kneading section, i.e., twin screw extruder.

In embodiments, the extruder of the present invention can be used as a compounder, mixer and a reactor. In embodiments, the extruder can be used for processing many types of materials. These materials can be, for example, polymeric and plastic materials, as well as raw materials for food processing. Of course, other material processes are also contemplated by the present invention. Also, advantageously, as described in more detail below, the extruder of the present invention significantly reduces material costs, and provides a simplified configuration, compared to conventional screw extruders.

Figure 1:
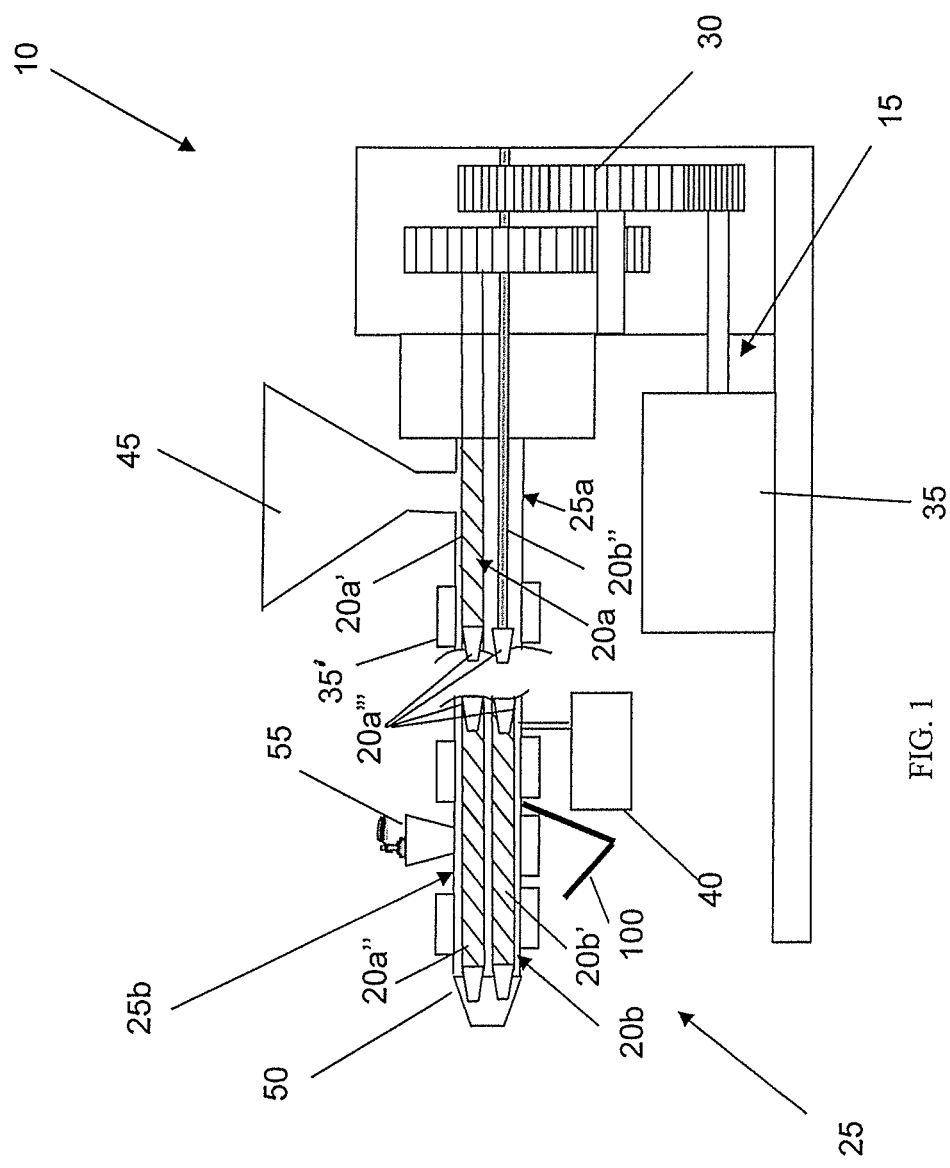
FIG. 1 shows a perspective view of the twin screw extruder in accordance with aspects of the present invention.

FIG. 1 shows a perspective view of the extruder in accordance with aspects of the present invention. More specifically, the extruder 10 includes a barrel assembly 25, comprising a single screw barrel assembly 25a (which houses a single screw 20a) and a twin screw barrel assembly 25b (which houses twin screws 20a, 20b). As shown in this exemplary configuration, a motor and drive system 15 drive screws 20a, 20b which are housed within the respective screw barrel assemblies 25a, 25b. The motor and drive system 15 include a plurality of gears 30 driven by motor 35 which, in turn, drive the screws 20a, 20b. As one of ordinary skill in the art should understand, the motor and drive system 15 can have many different configurations, and can provide variable drive rates for the screws 20a, 20b. For example, the motor and drive system 15 can provide both co-rotation and counter-rotation of the screws 20a, 20b.

More specifically, the barrel assembly 25 includes two separate, adjacent compartments (e.g., barrel assemblies) 25a, 25b. In embodiments, the barrel assembly 25a is positioned between the motor and drive system 15 (i.e., plurality of gears 30) and the barrel assembly 25b. That is, the barrel assembly 25a is at an upstream processing of the extrusion process; whereas, the barrel assembly 25b is positioned at downstream processing of the extrusion process. In embodiments, the barrel assemblies 25a, 25b can be separated by a swivel arm or other mechanism 100, in order to convert the extruder into a single extruder or combination of a single and twin screw extruder. In illustrative, non-limiting examples, the twin screw barrel assembly 25b can be separated or detached from the single screw barrel assembly 25a using the swivel arm, servo motors, rack and pinion gears, etc., all of which are represented by reference numeral 100. In embodiments, the twin screw barrel assembly 25b can be coupled to the single screw barrel assembly 25a by a hinge, also at reference numeral 100. In this way, the extruder of the present invention can function as either a single screw extruder (by removing the twin screw barrel assembly 25b) or as a twin screw extruder (by coupling together the screw barrel assemblies 25a, 25b).

As further shown in FIG. 1, in embodiments, the screw 20a can include two detachable threaded portions 20a' and 20a" provided in the respective screw barrel assemblies 25a, 25b. The detachable threaded portions 20a' and 20a" can be coupled together using any conventional coupling mechanism 20a'". For example, the coupling mechanism 20a'" can be a grooved mating surface, provided on adjoining ends of the detachable threaded portions 20a' and 20a". The threaded portion 20a' is provided in the single screw barrel assembly 25a (for upstream processing), and the threaded portion 20a" is provided in the twin screw barrel assembly 25b (for downstream processing).

In contrast, the screw 20b can include a threaded portion 20b' and non-threaded portion (e.g., shaft) 20b", which are coupled together using any conventional coupling mechanism 20a'". Similar to above, the coupling mechanism 20a'" can be a grooved mating surface, provided on adjoining ends of the components 20b' and 20b". In embodiments, the shaft 20b" can be hollow and devoid of screw elements, for example, in order to save material costs. Also, as should be understood from FIG. 1, the shaft 20b" is provided in the single screw barrel assembly 25a; whereas, the threaded portion 20b' is housed with the threaded portion 20a", in the twin screw barrel assembly 25b.

In the twin screw barrel assembly 25b, both screws 20a, 20b are threaded (e.g., twin screw configuration), which can be intermeshed or non-meshed, depending on the specific configuration of the present invention. In embodiments, the screw pattern of the threaded portions of the screws 20a, 20b can also include different thread configurations within the twin screw barrel assembly 25b, as further shown in FIG. 2. For example, the screw pattern can be a kneading block screw element, as one illustrative, non-limiting example. The screws 20a, 20b can be rotated either clockwise or counter clockwise.

In embodiments, the single screw barrel assembly 25a is a conveying compartment, which is used to house the thread portion 20a' and shaft 20b" of the screw 20b. In embodiments, the single screw barrel assembly 25a is designed to convey material fed from a hopper and feed system 45 to the adjacent twin screw barrel assembly 25b. The single screw barrel assembly 25a can also be used as a transition compartment. For example, heating of the material can begin in the single screw barrel assembly 25a through, for example, shearing friction and/or heaters. In embodiments, the threaded portion 20a' of screw 20a can include a conveying, transition, melting and metering zone, as should be understood by those of ordinary skill in the art.

The twin screw barrel assembly 25b, on the other hand, may be a kneading compartment, adjacent and in material flow communication with the single screw barrel assembly 25a. In embodiments, the kneading compartment can be a bi-lobule or tri-lobule kneading compartment. As described herein, material can be mixed, kneaded, heated, melted, metered, etc. within the twin screw barrel assembly 25b, using the two threaded portions 20a", 20b' of the respective screws 20a, 20b. In embodiments, the twin screw barrel assembly 25b will transit material to a die 50. As should be understood by those of skill in the art, the die 50 can include any combination of arrangements, for extruding different shapes.

In embodiments, the die 50 can be mounted to either the single screw barrel assembly 25a or the twin screw barrel assembly 25b, depending on the application of the extruder as a single screw extruder or a double screw extruder. For example, in the single screw extruder configuration, the die 50 can be removed from the twin screw barrel assembly 25b and directly mounted to the single screw barrel assembly 25a.

As optional components, the barrel assembly 25 can include heaters 35', as well as a cooling system 40. The heaters 35' are designed to heat material conveyed and kneaded within the barrel assembly 25. This will assist in the shearing of the material, as should be understood by those of skill in the art. An optional vent and vacuum port 55 can also be provided on the barrel assembly 25, preferably at the twin screw barrel assembly 25b. The vent and vacuum port 55 can be used to vent gases from the melt.

FIG. 2 shows an exploded view of the screws 20a, 20b in accordance with aspects of the present invention. As shown in FIG. 2, screw 20a has a length "X", which is substantially fully threaded and which can be greater than, less than or equal to the length "Y" of screw 20b. As should be understood by those of skill in the art, in embodiments, the length "X" of screw 20a may correspond to the length of the barrel assembly 25 of FIG. 1. Also, as shown in FIG. 2, the screw 20b has a threaded portion 20b' and a shaft portion 20b" devoid of any threaded elements. In embodiments, the shaft portion 20b" can be hollow, as it does no kneading, conveying, etc. of the material. In this way, additional material costs can be saved.

As further shown in FIG. 2, the screws 20a, 20b each include the coupling mechanism 20a'". As discussed above, the coupling mechanism 20a''' couples together the different portions of the screws 20a, 20b, in the twin extruder configuration of the present invention, i.e., when the single screw barrel assembly 25a and twin screw barrel assembly 25b are connected together. Similarly, the screws 20a, 20b can be decoupled from one another by the coupling mechanism 20a''', in the single extruder configuration of the present invention, i.e., when the twin screw barrel assembly 25b is swiveled away from the single screw barrel assembly 25a.

As discussed above, the shaft portion 20b'' will reside in the single screw barrel assembly 25a of FIG. 1 with the threaded portions 20a', so that only a single threaded screw is present. On the other hand, the threaded portion 20b' of screw 20b is configured to extend within the twin screw barrel assembly 25b, with the threaded portion 20a'' of the screw 20a'. In this way, threaded portions of the screws 20a, 20b will be provided in the twin screw barrel assembly 25b; whereas, only the threaded portion of the screw 20a will be present in the single screw barrel housing assembly 25a.

FIGS. 3a and 3b show the respective barrel assemblies 25a, 25b, in accordance with aspects of the present invention. As shown in these representations, the barrel assemblies 25a, 25b are of a cylindrical shape. More specifically, FIG. 3a shows an exploded view of the single screw barrel assembly 25a. As shown in this representation, the single screw barrel assembly 25a includes a hole 25a', for accommodating the threaded portion 20a' of screw 20a. The single screw barrel assembly 25a includes a hollow section 25a'', for accommodating the shaft portion 20b'' of the screw 20b. As an example, the hollow section 25a'' is only a cover.

FIG. 3b shows an exploded view of the twin screw barrel assembly 25b. As shown in this representation, the twin screw barrel assembly 25b includes a two hole configuration 25b' (e.g., similar to a FIG. 8 design), for accommodating the threaded screw 20a and the threaded portion 20b' of the screw 20b.

Figure 4A:
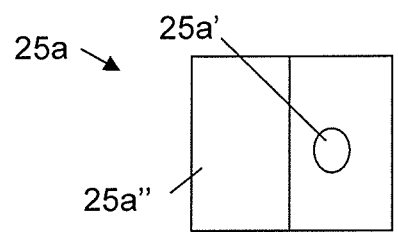
FIGS. 4a and 4b show alternative respective compartments (e.g., barrel assemblies) of the twin screw extruder in accordance with aspects of the present invention.
Figure 4B:
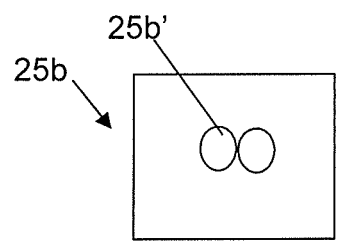

FIGS. 4a and 4b show alternative respective barrel assemblies 25a and 25b, in accordance with aspects of the present invention. As shown in these representations, the barrel assemblies 25a, 25b are of a rectangular or square shape. More specifically, FIG. 4a shows an exploded view of single screw barrel assembly 25a. As shown in this representation, the single screw barrel assembly 25a includes a hole 25a', for accommodating the threaded screw 20a. The single screw barrel assembly 25a also includes a hollow section 25a'' for accommodating the shaft portion 20b'' of the screw 20b. As an example, the hollow section 25a'' is only a cover.

FIG. 4b shows an exploded view of the twin screw barrel assembly 25b. As shown in this representation, the twin screw barrel assembly 25b includes a two hole configuration 25b' (e.g., similar to a FIG. 8 design), for accommodating the threaded portions of both screws 20a, 20b.

In operation, materials in the form of plastic pellets or powders, food, and others types are material are fed into the hopper 45, where they are conveyed and introduced to first portion of the single screw 20a (within the single screw barrel assembly 25a). Depending on the operating conditions, materials will then transit to the melting zone (for polymers or plastics). The L/D ratio of the single screw 20a within the single screw barrel assembly 25a may vary depending on the material specifications. At the final portion of the threaded portions 20a' of the single screw 20a, materials will be metered to the twin screw barrel assembly 25b, where the threaded portions of the screws 20a, 20b can process the material, e.g., mixing, compounding, kneading. The L/D ratio of the twin-screw section may also vary upon material specifications. Finally, the material will pass through the die 50 where it is taking off by conventional take-off machinery (e.g., a pellitizer).

In embodiments, when only the single screw extruder is used, it is possible to remove the twin screw barrel assembly 25b, and set it aside by using the mechanism 100. In this case, the tip of the threaded portions 20a' of the single screw 20a can be covered with a cap groove (also represented by reference numeral 20'''), e.g., a female grooved cap. The die 50 can then be mounted to the single screw barrel assembly 25a, so that the extruder machine can operate as single screw extruder.

Accordingly and advantageously, the present invention provides a simplified design compared to existing complicated screw extruders. That is, the present invention is able to significantly reduce material costs, as well as efficiently integrate a single screw and twin screw extruder together. Also, by using this simplified design, the present invention advantageously saves screw materials. Moreover, and importantly, it is now possible to simply use a single screw configuration to transit molten materials, e.g., polymers, etc., to the kneading section, e.g., twin screw configuration within the twin screw barrel assembly.

Also, as it should be understood by those of ordinary skill in the art, in conventional extruders, there are several extruding zones: solid conveying, transition, melting and kneading, and metering; however, in the extruder of the present invention, there is no need to provide two screws to convey and transit molten polymers to the kneading section. Instead, in the extruder of the present invention, a single screw can be used to convey and transit molten polymers (or other materials) to the kneading section, i.e., twin screw extruder.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. An integrated extrusion machine comprising:
   first and second detachably coupled barrel assemblies, the second barrel assembly arranged downstream the first barrel assembly;
   a first screw having first and second detachably coupled threaded portions, the first and second first screw threaded portions being housed within the first and second barrel assemblies respectively; and
   a second screw having detachably coupled non-threaded and threaded portions, the non-threaded and threaded second screw portions being housed within the first and second barrel assemblies respectively,
   wherein the extrusion machine is configured to operate as a twin screw extruder with a die mounted to the second barrel assembly when the first and second barrel assemblies are coupled and as a single screw extruder with the die mounted to the first barrel assembly when the first and second barrel assemblies are detached.

2. The extrusion machine of claim 1, wherein the second barrel assembly is swivelably detachable from the first barrel assembly.

3. The extrusion machine of claim 1, wherein the second barrel assembly is detachable from the first barrel assembly by one of a servo motor, a swivel arm, and a rack and pinion gear.

4. The extrusion machine of claim 1, wherein the non-threaded second screw portion is hollow.

5. The extrusion machine of claim 1, further comprising a hopper which feeds material into the first barrel assembly.

6. The extrusion machine of claim 5, wherein for the twin screw extruder configuration, the first threaded portion housed within the first barrel assembly transports the fed material as molten material to the second barrel assembly for downstream processing by the second threaded first screw portion and the threaded second screw portion.

7. The extrusion machine of claim 5, wherein for the twin screw extruder configuration, the first barrel assembly acts as a transition compartment heating the fed material and the second barrel assembly acts as a kneading compartment.

8. The extrusion machine of claim 1, wherein when the extrusion machine operates as a twin screw extruder, the first and second first screw portions are coupled by a mating surface and the non-threaded and threaded second screw portions are coupled by a mating surface.

9. The extrusion machine of claim 8, wherein each mating surface is a grooved mating surface.

10. The extrusion machine of claim 1, wherein for the single screw extruder configuration, the first and second first screw threaded portions are decoupled from one another and the non-threaded and threaded second screw portions are decoupled from one another.

11. The extrusion machine of claim 10, further comprising a cap covering an end of the first threaded portion of the first screw when the first and second first screw threaded portions are decoupled from one another.

* * * * *